United States Patent
Hasegawa et al.

(10) Patent No.: US 6,817,265 B2
(45) Date of Patent: Nov. 16, 2004

(54) STEERING DAMPER DEVICE

(75) Inventors: Yosuke Hasegawa, Saitama (JP); Takeyasu Itabashi, Saitama (JP); Kanji Hayashi, Saitama (JP); Takeshi Wakabayashi, Saitama (JP); Osamu Bunya, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/102,848

(22) Filed: Mar. 22, 2002

(65) Prior Publication Data

US 2002/0152832 A1 Oct. 24, 2002

(30) Foreign Application Priority Data

Apr. 6, 2001 (JP) ........................................ 2001-108981

(51) Int. Cl.[7] .................................................. F16F 9/14
(52) U.S. Cl. .................... 74/551.1; 74/574; 280/271; 280/272
(58) Field of Search ............................ 74/551.1, 551.2, 74/574, 573 R, 573 F, 551.8; 280/271, 272

(56) References Cited

U.S. PATENT DOCUMENTS

| | | | | |
|---|---|---|---|---|
| 4,700,963 A | * | 10/1987 | Burns et al. ................. | 280/276 |
| 4,773,514 A | * | 9/1988 | Gustafsson .................. | 188/306 |
| 4,811,807 A | * | 3/1989 | Schier ......................... | 180/421 |
| 5,492,033 A | * | 2/1996 | Hopey ........................ | 74/551.1 |
| 5,836,213 A | * | 11/1998 | Hopey ........................ | 74/551.2 |
| 6,401,884 B2 | * | 6/2002 | Norman et al. ............. | 188/310 |
| 6,705,631 B2 | * | 3/2004 | Hasegawa et al. .......... | 280/272 |
| 6,726,232 B2 | * | 4/2004 | Hasegawa et al. .......... | 280/272 |

FOREIGN PATENT DOCUMENTS

| | | | | |
|---|---|---|---|---|
| JP | 62-12464 | * | 1/1987 | .................. 280/90 |
| JP | 2593461 B2 | | 12/1996 | |

* cited by examiner

*Primary Examiner*—David A. Bucci
*Assistant Examiner*—Vicky A. Johnson
(74) *Attorney, Agent, or Firm*—Birch, Stewart, Kolasch & Birch, LLP

(57) ABSTRACT

A steering damper device attenuating the oscillations of the handlebar of a motorcycle during operation, and more particularly, a device capable of varying a damping force variable. The steering damping device prevents the adverse effect of oscillations of the handlebar that would otherwise occur when the load on the front wheel of the motorcycle becomes light. The device includes a rotary steering damper provided in a coaxial manner on a steering shaft. Either a damping force or zero damping force is produced by a variable valve arranged in the bypass passage communicating with a right liquid chamber and a left liquid chamber. The variable valve is controlled by a control device and generates a damping force in the steering damper only when the acceleration of the motorcycle as detected by the acceleration sensor exceeds a threshold value.

15 Claims, 4 Drawing Sheets

STEERING DAMPER DEVICE

CROSS-REFERENCE TO RELATED APPLICATIONS

The present application claims priority under 35 U.S.C. §119 to Japanese Patent Application No. 2001-108981, filed on Apr. 6, 2001, the entire contents thereof are hereby incorporated by reference.

BACKGROUND OF THE INVENTION

1. Field of the Invention

This invention relates to a steering damper device for a motorcycle for attenuating oscillations of its handlebar during running operation, and more particularly a device capable of making a damping force variable.

2. Description of Background Art

In order to prevent any oscillation of a handlebar caused by a kickback or the like under external disturbance, it is well known in the art to provide a steering damper device generating a damping force against oscillation (as one example, refer to Japanese Patent No. 2,593,461). In addition, it is also well known in the art to provide a device generating a damping force only when it is required and making a damping force variable in other cases so as not to generate any surplus damping force. Examples include a device for controlling it in response to a steering angle and a running speed (refer to Japanese Patent Laid-Open No. Sho 63-64888), and a device for controlling it in response to a variation in a load of the front wheel (refer to Japanese Patent Publication No. Hei 7-74023).

As disclosed in Japanese Patent Publication No. Hei 7-74023, when a front wheel load is decreased, a kickback phenomenon may easily be produced, and either an inner pressure at a front fork or its stroke in this case detects the decreased front wheel load. However, usually a pressure in the front fork is changed in response to its inner temperature, making it difficult to perform an accurate sensing of the front wheel load. In addition, when the stroke of the front wheel is detected, the structure of detecting the stroke becomes complicated and the cost required for the entire vehicle body is increased. In view of this fact, it is desired to detect the front wheel load by a more accurate and simple detecting structure.

SUMMARY AND OBJECTS OF THE INVENTION

The present invention addresses the problems described above. In order to solve the above problems, the steering damper device of the present invention produces a damping force applied to a turning operation of a front wheel steering system supported at a vehicle body front segment. The value of the damping force is made variable, wherein an acceleration sensing means for sensing an acceleration of the vehicle body is provided, and only when the acceleration exceeds a predetermined threshold value, is the damping force generated at the steering damper.

This makes it possible to generate a damping force at the steering damper only when both a speed of the vehicle body and an acceleration of the vehicle body exceed the predetermined threshold values. In addition, it is also possible to cause the damping force of the steering damper to be changed in response to a speed and/or an acceleration of the vehicle body.

Further, it is also possible to detect a speed of the vehicle body in response to a gear position and the frequency of rotation of the engine, and to detect an acceleration of the vehicle body in response to an opening speed of the throttle.

In accordance with the present invention, when an acceleration of the vehicle body exceeds a predetermined threshold value, the load on the front wheel is decreased. When this occurs, a kickback may occur. However, with the present invention, it is possible to generate a damping force at the steering damper and to restrict the kickback. Further, with the present invention, since an acceleration of the vehicle body is not influenced by a temperature, detecting the acceleration is not as difficult as is the case with prior art devices. Thus, since a complex structure for use in detecting the acceleration is not required, the present invention provides for a more accurate and simple damping force control.

If in addition to the acceleration, the vehicle body speed is also applied as a controlling condition, a damping force is generated only when the vehicle body speed exceeds a predetermined threshold value. Thus, the controlling operation preventing against kickback becomes more accurate. This state is attained based on the fact that a relative large acceleration is apt to be generated at a low vehicle speed, and a relative low acceleration is apt to be generated at a high vehicle speed. Thus, by also considering the vehicle body speed as well as the acceleration, the present invention provides a means for correcting the damping force generated only by the acceleration.

Further, if the damping force is changed in response to either a vehicle body speed or a vehicle acceleration, or both of them, it is possible to generate an appropriate damping force of the steering damper responding to an operating state.

In addition, when a vehicle body speed is detected in response to both a gear position and the engine rotation frequency and an acceleration is detected in response to a throttle opening speed, it is not necessary to use an acceleration sensor or a vehicle body speed sensor exclusively. When both the vehicle body speed and the vehicle acceleration are considered, an appropriate damping force of the steering damper can be more accurately generated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
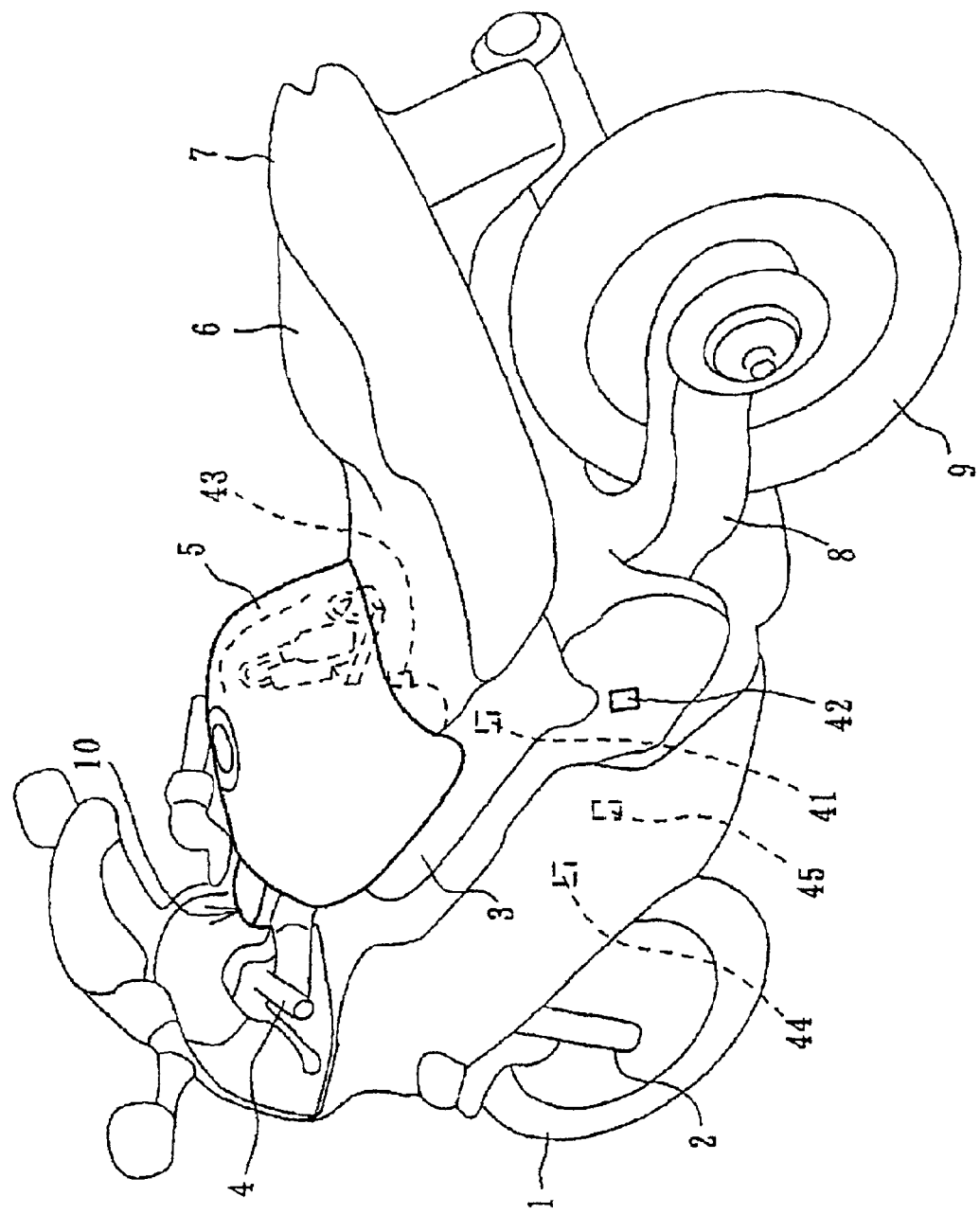
FIG. 1 is a perspective view for showing a motorcycle to which the preferred embodiment is applied.
Figure 2:
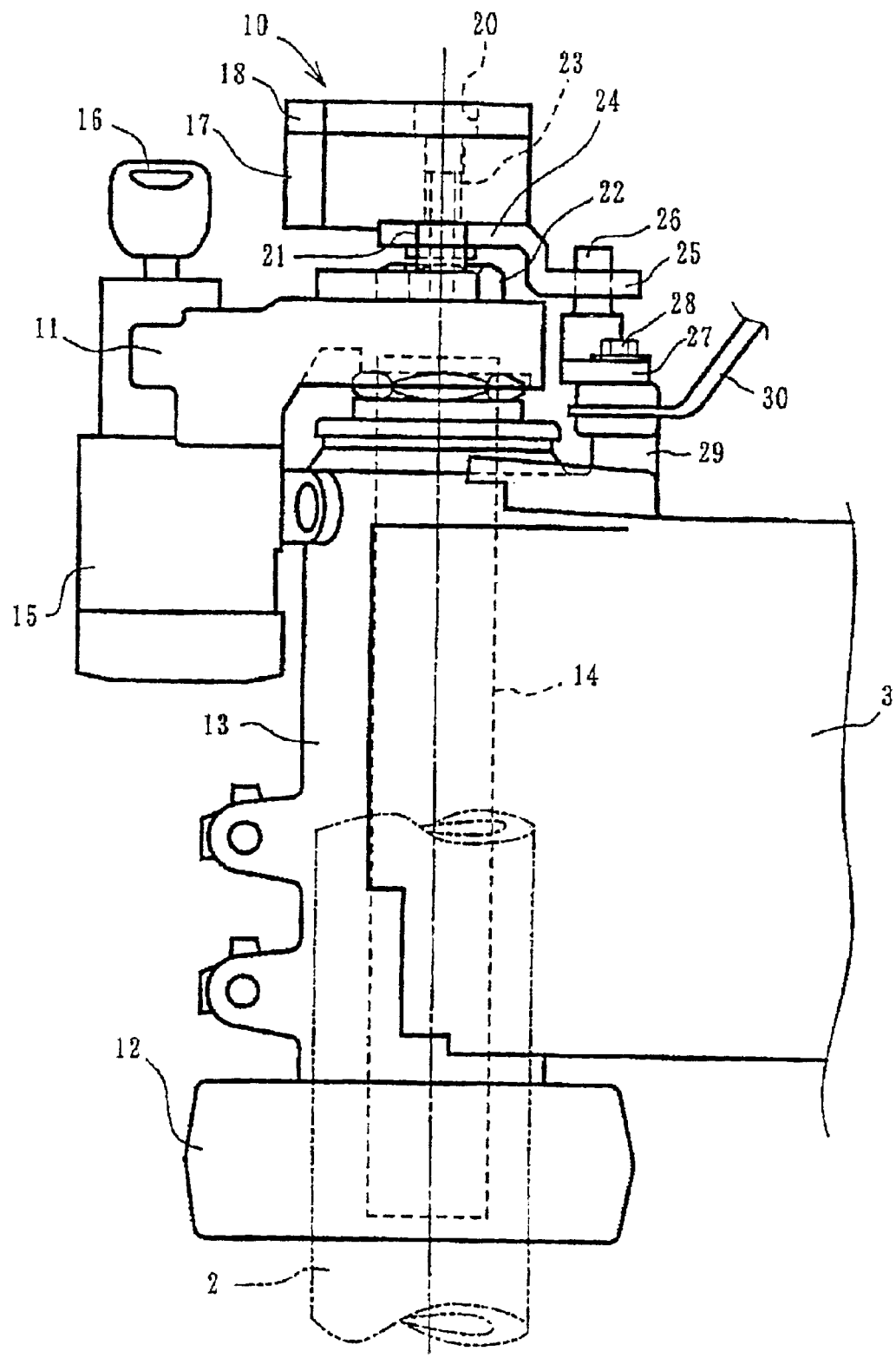
FIG. 2 is a side elevation view for showing a vehicle body front segment to indicate a part of the steering damper device.
Figure 3:
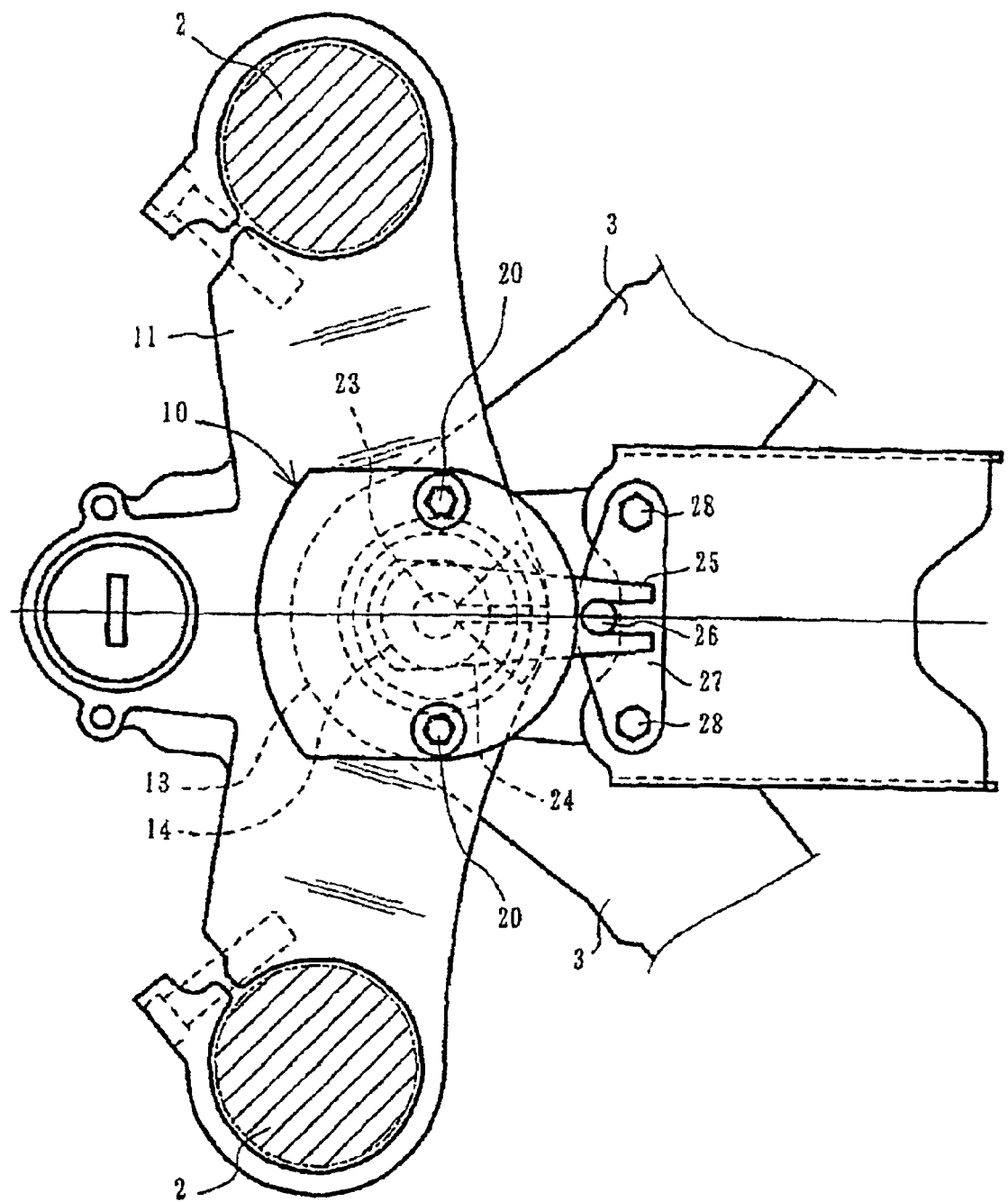
FIG. 3 is a top plan view for showing the part of the steering damper device.
Figure 4:
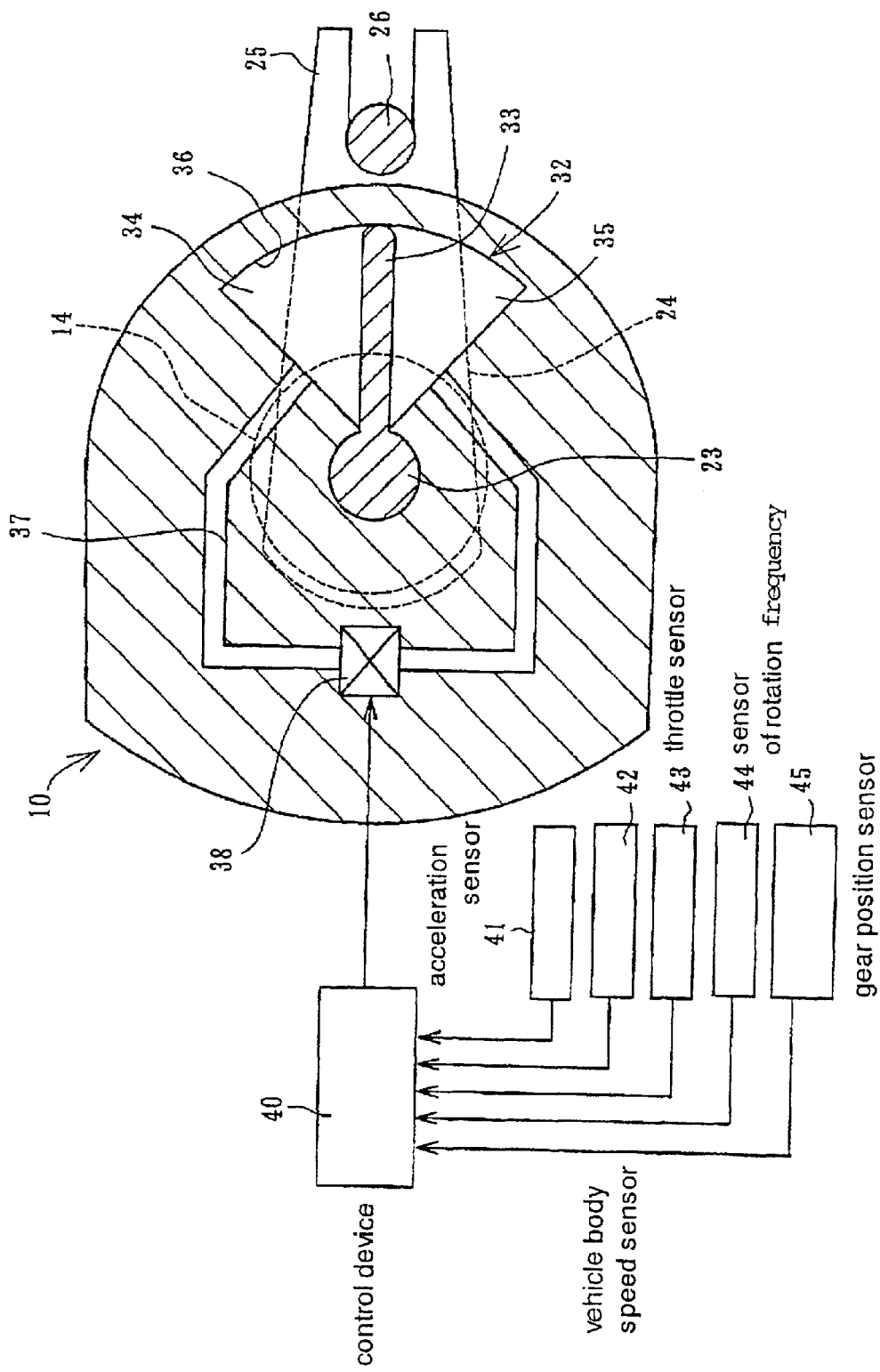
FIG. 4 is a view for showing a schematic structure of the steering damper.

Referring now to the drawings, one preferred embodiment of the present invention will be described as follows. FIG. 1 is a perspective view for showing a motorcycle to which the preferred embodiment of the present invention is applied. FIG. 2 is a side elevation view for showing a vehicle body front segment structure having a steering damper arranged. FIG. 3 is a top plan view for showing the vehicle body front segment structure. FIG. 4 is a view for showing a schematic structure of a steering damper.

In FIG. 1, the upper part of front forks 2 supporting a front wheel 1 at their lower ends is connected to the front part of a vehicle body frame 3 and the upper part can be turned by a handlebar 4. A fuel tank 5 is supported on the vehicle body frame 3. Reference numeral 6 denotes a seat, reference numeral 7 denotes a rear cowl, reference numeral 8 denotes a rear swing arm and reference numeral 9 denotes a rear wheel.

The steering damper will be described next. As shown in FIGS. 2 and 3, a steering damper 10 is arranged between a top bridge 11 having the handlebar 4 fixed thereto and the front end of the vehicle body frame 3. The top bridge 11 is a member integrally assembled with a steering shaft 14 (indicated by a center line) supported at a head pipe 13 by a lower bottom bridge 12 being held therebetween. The top bridge 11, bottom bridge 12 and steering shaft 14 are integrally turned.

Each of the upper segments of a pair of right and left front forks 2 is supported at the top bridge 11 and the bottom bridge 12, respectively. The head pipe 13 is a pipe-like segment integrally assembled with the front ends of the vehicle body frames 3. The vehicle body frames 3 in a pair of right and left segments extend from the head pipe 13 in a rearward direction (FIG. 3). A steering lock 15 is arranged in front of the head pipe 13 and its lock is unlocked with a key 16.

The steering damper 10 of the preferred embodiment is a hydraulic damper for preventing the kickback. It is comprised of a main body 17 and a lid 18. The steering damper is fastened with a bolt 20 to a nut segment arranged at a hub 21 on the top bridge 11. The main body 17 and the lid 18 are also integrally assembled with the bolt 20. Numeral 22 denotes a nut for connecting the top bridge 11 with the upper end of the steering shaft 14.

A damper shaft 23 is arranged within the steering damper 10 with its axis being directed in an upward or downward direction as shown in FIG. 2. The lower end of the damper shaft 23 extends out of the main body 17 in a downward direction and integrally formed with the front end of the arm 24. The damper shaft 23 is coaxially arranged at the steering shaft 14.

The arm 24 is bent in a crank-like shape as viewed in a side elevation view and extends in a forward or rearward direction at the center of the vehicle body as viewed in a top plan view. The front end of the arm extends upwardly toward the upper part of the nut 22 and integrally assembled with the damper shaft 23 projecting into the steering damper 10. The rear end of the arm 24 forms forked ends 25 and a hub 26 of the vehicle body frame 3 is fitted to the forked ends.

The hub 26 is arranged at the central part of a bracket 27 to project upwardly. The bracket 27 at its both right and left ends is fixed with bolts 28 to a hub 29 arranged at a central part of the front end of the front wheel 1. A stay 30 projecting from the front end of the fuel tank 5 is fastened together on the hub 29 by bolts 28.

FIG. 4 shows schematically a structure of the steering damper 10. A fan-like liquid chamber 32 expanding in a rearward direction is arranged inside the steering damper 10. A damper shaft 23 is positioned at its essential position, and an inner part of the liquid chamber 32 is divided into a right liquid chamber 34 and a left liquid chamber 35 by a wing-like segment 33 extending rearwardly integrally from the damper shaft 23.

The extremity end of the wing-like segment 33 forms a sliding surface and slidably contacts with the inner surface of an arcuate wall 36 of the liquid chamber 32. Non-compressive liquid such as oil or the like is sealingly filled in the right liquid chamber 34 and the left liquid chamber 35. The right liquid chamber 34 and the left liquid chamber 35 are connected by a bypass passage 37. A variable valve 38 is arranged at the midway part of the bypass passage 37. The variable valve 38 has a metering passage for use in generating a damping force and the variable valve can meter the metering passage by changing a sectional area of the metering passage. However, the variable valve 38 is not restricted to such a structure as above and various types of well-known structure can be employed.

A control device 40 controls metering of the variable valve 38. The control device 40 is a microcomputer, or the like. This control device 40 controls the variable valve 38 in response to each of the sensing signals of an acceleration sensor 41, vehicle body speed sensor 42, throttle sensor 43, engine rotation frequency sensor 44 for an engine and gear position sensor 45 or the like. A metering of the variable valve 38 is changed to adjust a damping force under a predetermined condition.

A method for controlling damping force of the steering damper 10 performed by the control device 40 can be classified into two cases. In the first case, the damping force is generated when a predetermined threshold value of acceleration is exceeded. In the second case, a determination is made as to whether a vehicle body speed exceeds the threshold value. If so, the damping force generated by sensing the acceleration alone is changed based on the vehicle speed. Thus, it is possible to change the damping force in response to both an acceleration and a vehicle body speed. Further, the throttle sensor 43 can be used in place of the acceleration sensor 41, and the rotation frequency sensor 44 for the engine and the gear position sensor 45 can be used in place of a vehicle body speed sensor 42.

Each of the aforesaid sensors is a well-known sensor. The acceleration sensor 41 is a G sensor for sensing a vehicle body acceleration. This sensor is installed at an appropriate location in a vehicle. The vehicle speed sensor 42 detects a vehicle speed in reference to the frequency of rotation of the output sprocket of an engine, or the like. The throttle sensor 43 detects a degree of opening of the throttle arranged in an intake passage, the rotation frequency sensor 44 of the engine detects the frequency of rotation of the crank shaft, and the gear position sensor 45 detects a present gear position in the transmission.

Next, the operation of the present preferred embodiment will be described. When the acceleration detected by the acceleration sensor 41 is below a predetermined threshold value, it is judged that there is a less possibility that a kickback will occurs. Therefore, the control device 40 does not generate any damping force at the steering damper 10. Further, since there is no increase in a handlebar load, a smooth and comfortable steering operation can be attained. In turn, when the value exceeds a predetermined threshold value, the front wheel load becomes light, and a kickback may easily occur, the control device 40 changes the variable valve 38 to its metering side to meter the bypass passage 37, increases a flowing resistance of liquid and increases a damping force.

As a result, a liquid flow between the right liquid chamber 34 and the left liquid chamber 35 is restricted to restrict a turning of the steering shaft 14, thus further restricting the possibility of a kickback. With the present invention, it is possible to eliminate the influence of temperature as found in the prior art front wheel load sensing operation, and the sensing operation can be carried out by a less complex structure.

As a result, with the present invention, the turning difficulties of the steering shaft 14 and the steering system caused by the kickback are restricted.

At this time, the vehicle speed is also monitored in response to a sensing signal of the vehicle body speed sensor 42. In this situation, the damping force is generated only when both the vehicle acceleration and the vehicle body speed each exceed predetermined threshold values. As such, control can be provided more accurately, since both the acceleration and the speed of the vehicle are considered. It is well known that acceleration of the vehicle and possibility of kickback can easily occur easily when the vehicle is running at low speeds. On the other hand, acceleration and the possibility of kickback is reduced when the vehicle is running at a high speed. In this latter situation, the front wheel load can be held more accurately. Thus, using the a vehicle body speed to adjust the damping force that was produced by the sensing of the vehicle acceleration alone provides for a more accurate control of the damping force.

Additionally, a damping force is not only generated when the value exceeds a threshold value as described above. The damping force can also be changed in a multi-stage manner or continuous manner in response to either one of an acceleration or a vehicle body speed or both of them. If such an arrangement is applied, a more appropriate control over the steering damper 10 corresponding to the operating state becomes possible.

Further, an acceleration can be calculated in response to a sensing signal of the throttle sensor 43 for sensing a variation of a degree of opening of the throttle. Also, a vehicle body speed can be calculated in response to sensing results of the rotation sensor 44 for sensing the engine rotation frequency and the gear position sensor 45 for sensing a gear position. In such an arrangement, it is not necessary to use the acceleration sensor 41 or the vehicle body speed sensor 42 exclusively. Both a vehicle body speed and a vehicle body acceleration can be detected accurately, making it possible to generate an appropriate damping force of the steering damper.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper device in which a damping force is applied to a turning operation of a front wheel steering system supported at a vehicle body front segment and a value of the damping force varies, the steering damper device comprising:
   a throttle sensor sending a signal for calculating an acceleration of the vehicle body, and when said acceleration and a speed of the vehicle body exceed a predetermined threshold value, a damping force is generated at the steering damper.

2. The steering damper device according to claim 1, further comprising:
   a control device for controlling a variable valve connecting two sides of a liquid chamber;
   a vehicle body speed sensor;
   an acceleration sensor;
   an engine rotation frequency sensor; and
   a gear position sensor,
   wherein the control device controls said variable valve for changing said damping force in response to sensing signals from each of said sensors.

3. The steering damper device according to claim 2, wherein the variable valve has a metering passage and the variable valve can meter the metering passage by changing a sectional area of the metering passage.

4. The steering damper device according to claim 1, wherein the damping force of the steering damper is changed in response to at least one of a speed of the vehicle body and the acceleration of the vehicle body.

5. The steering damper device according to claim 1, wherein a speed of the vehicle body is detected in response to a signal from a gear position sensor and a signal from an engine rotation frequency sensor, and the acceleration of the vehicle body is detected in response to a signal from a acceleration sensor.

6. A steering damper device for a vehicle in which a damping force is applied to a turning operation of a front wheel steering system, comprising:
   a handlebar and a steering shaft mounted on a vehicle body for steering said vehicle;
   a steering damper having a main body mounted on said steering shaft;
   a damper shaft coaxially arranged with said steering shaft and disposed within said steering damper, said damper shaft having a winged segment extending rearwardly into a liquid chamber of said main body, and dividing said chamber into right and left liquid portions of said liquid chamber;
   an acceleration sensor for detecting an acceleration of said vehicle;
   a bypass passage between said right and left portions of said liquid chamber, the bypass passage having a variable valve; and
   a control device for receiving an acceleration signal and actuating the variable valve in the bypass passage to thereafter connect said right and left portions of said liquid chamber,
   wherein a value of a damping force generated on said winged segment varies, and only when said acceleration exceeds a predetermined threshold value is said damping force generated on said winged segment of said steering damper,
   wherein a speed of the vehicle body is detected in response to a signal detected by a gear position sensor and a signal detected by an engine rotation frequency sensor, and the acceleration of the vehicle body is detected in response to a signal detected by a throttle sensor.

7. The steering damper device according to claim 6, wherein only when a speed of the vehicle body and the acceleration of the vehicle body each exceed a predetermined threshold value is the damping force changed at the steering damper.

8. The steering damper device according to claim 6, further comprising:
   a control device for controlling said variable valve; and
   a vehicle body speed sensor;

wherein the control device controls the variable valve for changing said damping force in response to sensing signals from each of said sensors.

9. The steering damper device according to claim 8, wherein the variable valve has a metering passage and the variable valve can meter the metering passage by changing a sectional area of the metering passage.

10. The steering damper device according to claim 6, wherein a damping force of the steering damper is changed in response to at least one of a speed of the vehicle body and the acceleration of the vehicle body.

11. A steering damper device in which a damping force is applied to a turning operation of a front wheel steering system supported at a vehicle body front segment and a value of the damping force is made variable comprising an acceleration sensor for sensing an acceleration of the vehicle body, wherein only when a speed of the vehicle body and the acceleration of the vehicle body each exceed a predetermined threshold value is the damping force changed the steering damper, the speed of the vehicle body being detected in response to a signal from a gear position sensor and a signal from an engine rotation frequency sensor.

12. The steering damper device according to claim 11, further comprising:

a control device for controlling a variable valve connecting two sides of a liquid chamber;

a vehicle body speed sensor;

a throttle sensor;

said engine rotation frequency sensor; and said gear position sensor, wherein the control device controls said variable valve for changing said damping force in response to sensing signals from each of said sensors.

13. The steering damper device according to claim 12, wherein the variable valve has a metering passage and the variable valve can meter the metering passage by changing a sectional area of the metering passage.

14. The steering damper device according to claim 11, wherein the damping force of the steering damper is changed in response to at least one of the speed of the vehicle body and the acceleration of the vehicle body.

15. The steering damper device according to claim 11, wherein a speed of the vehicle body is detected in response to a signal from a throttle sensor.

* * * * *